US006579932B1

(12) United States Patent
Schipper et al.

(10) Patent No.: US 6,579,932 B1
(45) Date of Patent: Jun. 17, 2003

(54) AQUEOUS COATING COMPOSITION COMPRISING A MIXTURE OF POLYURETHANE DISPERSIONS

(75) Inventors: Katinka Schipper, Sassenheim (NL); Rudolf Verbiest, Leiden (NL); Petrus Johannes Arnoldus Geurink, Voorhout (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/830,495

(22) PCT Filed: Oct. 20, 1999

(86) PCT No.: PCT/EP99/08158

§ 371 (c)(1),
(2), (4) Date: Jun. 17, 2001

(87) PCT Pub. No.: WO00/24837

PCT Pub. Date: May 4, 2000

(30) Foreign Application Priority Data

Oct. 26, 1998 (EP) .............................................. 98203590

(51) Int. Cl.$^7$ ................................................ C08K 3/00
(52) U.S. Cl. ...................................... 524/501; 524/588
(58) Field of Search .................................. 524/501, 589

(56) References Cited

U.S. PATENT DOCUMENTS

| 4,172,822 A | | 10/1979 | Patzschke | .................. | 260/29.2 |
|---|---|---|---|---|---|
| 4,730,021 A | * | 3/1988 | Zom | ........................ | 524/457 |
| 4,983,662 A | | 1/1991 | Overbeek | .................. | 524/501 |

FOREIGN PATENT DOCUMENTS

| CA | 2261232 | 4/1998 | ......... C08F/283/00 |
|---|---|---|---|
| DE | 196 29 941 A1 | 1/1998 | ......... C09D/167/08 |
| DE | 196 39 325 A1 | 3/1998 | ......... C08F/283/00 |
| EP | 0 332 326 A2 | 9/1989 | ........... C08G/18/10 |
| GB | 2 100 271 A | 12/1982 | ........... C08L/67/00 |
| WO | WO 97/19120 | 5/1997 | ........... C08G/18/08 |

OTHER PUBLICATIONS

Derwent Abstract No. 011694290 (1998), abstracting DE 196 29 941 A1.
Tennebroek, et al "Self–crosslinkable urethanes and urethane/acrylics," European Coatings Journal, 1997, No. 11, p.p. 1016–1021.
Bell, et al "Waterborne urethane chemistry for clear wood varnishes," Paint & Ink International, Sep./Oct. 1996, p.p. 6–10.
International Search Report PCT/EP 99/08158.

* cited by examiner

*Primary Examiner*—Edward J. Cain
(74) *Attorney, Agent, or Firm*—Lainie E. Parker; David H. Vickrey; Michelle J. Burke

(57) ABSTRACT

The present invention relates to an aqueous coating composition comprising: 5–95 wt. % of a polyurethane/acrylate hybrid dispersion and 95–5 wt. % of a dispersion of a polyurethane resin with oxidatively drying groups. Optionally, the coating composition comprises in addition to the above-mentioned dispersions an emulsion of an alkyd resin. The coating composition can be used as a translucent or opaque primer or topcoat or as a clearcoat in decorative applications.

19 Claims, No Drawings

AQUEOUS COATING COMPOSITION COMPRISING A MIXTURE OF POLYURETHANE DISPERSIONS

This application is the national phase of International Patent Application No. PCT/EP99/08158, filed on Oct. 20, 1999, and which claims priority of European Patent Application No. 98203590.9, filed Oct. 26, 1998.

This invention relates to aqueous coating compositions and more particularly to aqueous coating compositions comprising a mixture of different polyurethane dispersions.

Aqueous coating compositions comprising a polyurethane dispersion are well-known for the production of film coatings on various substrates such as wood, metal, fabrics, and plastics. These may be useful for the provision of, for example, protective coatings, since polyurethane resins possess very desirable properties such as good chemical resistance, abrasion resistance, toughness, adhesion, and durability.

BACKGROUND OF THE INVENTION

The present invention relates to an aqueous coating composition comprising: 5–95 wt. % of at least one polyurethane/acrylate hybrid dispersion and 95–5 wt. % of at least one dispersion of a polyurethane resin with oxidatively drying groups.

SUMMARY OF THE INVENTION

The weight percentages are based on the weight of total solid polyurethane resins present. The aqueous coating composition may comprise a mixture of different polyurethane/acrylate hybrid dispersions and/or a mixture of dispersions of different polyurethane resins with oxidatively drying groups.

It has been found that the use of a mixture of a polyurethane/acrylate hybrid dispersion and a dispersion of a polyurethane resin with oxidatively drying groups in aqueous coating compositions provides synergistic properties which cannot be obtained when using one of the polyurethane resin dispersions. Such properties are, for example, levelling, open time, and processability. Other properties such as scratch resistance and hardness remain at a very good level. Furthermore, coating compositions with a low VOC can be provided, as required by the present environmental laws.

In Tennebroek et al., *European Coatings Journal*, 1997, No. 11, pp. 1016–1021, an evaluation is provided of coating compositions comprising either a polyurethane/acrylate hybrid dispersion or a dispersion of a polyurethane resin with oxidatively drying groups. In Bell et al., *Paint & Ink International*, September/October 1996, pp. 6–10, an evaluation is provided of coating compositions comprising a dispersion of a polyurethane resin with oxidatively drying groups for application on wood surfaces. EP-A-0 332 326 discloses coating compositions comprising polyurethane/acrylate hybrid dispersions. None of the above-mentioned publications teaches or suggests the possibility of combining a polyurethane/acrylate hybrid dispersion with a dispersion of a polyurethane resin with oxidatively drying groups, nor are the synergistic effects obtained by this combination recognised.

Preferably, the aqueous coating composition comprises: 40–90 wt. % of at least one polyurethane/acrylate hybrid dispersion and 10–60 wt. % of at least one dispersion of a polyurethane resin with oxidatively drying groups.

The aqueous coating composition preferably has a VOC of 350 g/l or less, more preferably a VOC of 50 to 350 g/l, most preferably a VOC of 100 to 300 g/l, measured according to ASTM 3960-92.

A polyurethane/acrylate hybrid dispersion is defined as an aqueous dispersion comprising at least one polyurethane resin and at least one vinyl polymer. A vinyl polymer in this specification is meant to be a polymer obtained by the free radical addition polymerisation of at least one olefinically unsaturated monomer.

The polyurethane/acrylate hybrid dispersion may be formed by subjecting one or more vinyl monomers to free radical polymerisation conditions in the presence of a dispersion of an already chain-extended polyurethane resin using conventional techniques. Thus, free radical initiators may be added to a mixture of polyurethane dispersion and vinyl monomer or, alternatively, monomer may be added gradually to a polyurethane dispersion containing initiator.

In another variant of the preparation of polyurethane/acrylate hybrid dispersions a solution is formed of an isocyanate-terminated prepolymer in at least one vinyl monomer. The solution is then emulsified in an aqueous medium and the isocyanate-terminated prepolymer is chain extended. Subsequently, either vinyl monomer can be added and the polymerisation thereof initiated or the polymerisation of the vinyl monomer can be initiated and further vinyl monomer can be added during polymerisation.

Conventional free radical initiators may be used such as hydrogen peroxide, t-butyl hydroperoxide, persulphates such as $NH_4$ persulphate, K persulphate, and Na persulphate. The amount generally is 0.05 to 3 wt. %, based on the weight of total vinyl monomers charged. Other suitable free radical initiators for such variants include mixtures such as a combination of t-butyl hydroperoxide, isoascorbic acid, and Fe.EDTA.

The weight ratio of polyurethane resin to vinyl resin in the composition is suitably in a range of 9:1 to 1:9, more preferably 5:1 to 1:5.

Preferably, the polyurethane/acrylate hybrid dispersion comprises hydrazine- (or hydrazone-) functional groups and carbonyl-functional groups to provide a self-crosslinking reaction. The hydrazine- (or hydrazone-) functional groups and carbonyl-functional groups may be present as chain pendant groups in the polyurethane or the polyacrylate or both, or they may be present as separate compounds in the polyurethane/acrylate hybrid dispersion. For the sake of clarity, in this specification (unless specified otherwise) by a carbonyl functionality is meant the carbonyl functionality of a ketone or aldehyde group. Also, by a hydrazine-functional group is meant the functional group of formula —$NHNH_2$. A hydrazone-functional group is a group derived from such a hydrazine group by reaction with a monoketone or monoaldehyde containing at least 2 carbon atoms. It is preferred that the hydrazine- (or hydrazone-) functional groups and carbonyl-functional groups are present in an equivalent ratio of 1:20 to 20:1, more preferably 1:10 to 10:1.

As is well-known, polyurethane resins generally are made by reacting an organic polyisocyanate with an organic compound containing isocyanate-reactive groups, particularly a macro polyol, optionally with the inclusion of a low-molecular weight organic polyol. A favoured route to their formation involves the formation of an isocyanate-terminated polyurethane prepolymer followed by chain extension with an active hydrogen-containing compound.

The isocyanate-terminated prepolymer preparation reaction takes place under substantially anhydrous conditions at a temperature between about 30 and about 130° C. until the reaction between the isocyanate groups and the isocyanate-reactive groups is substantially complete. During the production of the isocyanate-terminated prepolymer the reactants generally are used in proportions corresponding to a ratio of isocyanate groups to isocyanate-reactive groups of from about 1.1:1 to about 6:1, preferably from about 1.5:1 to 3:1. If desired, catalysts such as dibutyl tin dilaurate or stannous octoate may be used to assist prepolymer formation. A non-reactive organic solvent may optionally be added before or after prepolymer formation to control the viscosity. Suitable solvents which may be used include acetone, methylethyl ketone, dimethyl formamide, ethylene carbonate, propylene carbonate, diglyme, N-methyl pyrrolidone (NMP), ethyl acetate, ethylene and propylene glycol diacetates, alkyl ethers of ethylene and propylene glycol diacetates, alkyl ethers of ethylene and propylene glycol monoacetates, toluene, xylene, and sterically hindered alcohols such as t-butanol and diacetone alcohol. The preferred solvents are water-miscible solvents such as N-methyl pyrrolidone (NMP), dimethyl sulphoxide, and dialkyl ethers of glycol acetates or mixtures of N-methyl pyrrolidone (NMP) and methylethyl ketone.

The chain extension can be conducted at elevated, reduced or ambient temperatures. Convenient temperatures are from about 5 to 95° C. or, more preferably, from about 10 to about 45° C. The total amount of chain extender material(s) employed (besides water) should be approximately equivalent to the free-NCO groups in the prepolymer, the ratio of active hydrogens in the chain extender(s) to NCO groups in the prepolymer preferably being in the range from 0.7:1 to 2.0:1, more preferably 0.8:1 to 1.7:1. Of course, when water is employed as a chain extender, these ratios will not be applicable since the water, functioning both as chain extender and dispersing medium, will be present in a gross excess relative to the free-NCO groups.

The polyisocyanate used in making the isocyanate-terminated prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4-dicyclohexylmethane diisocyanate, p-xylene diisocyanate, tetramethylxylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates, and 1,5-naphthylene diisocyanate. Mixtures of polyisocyanates can be used and also polyisocyanates which have been modified by the introduction of urethane, allophanate, urea, biuret, carbodiimide, uretonimine, uretdione, or isocyanurate residues.

The polymeric organic compounds containing at least two isocyanate-reactive groups and having weight average molecular weights in the range 400–6000 which may be used in the preparation of isocyanate-terminated prepolymers preferably are polymeric organic polyols terminated by hydroxyl groups (although it would be possible to use polymeric compounds with other isocyanate-reactive groups, e.g., primary amino or carboxyl groups). The organic polyols particularly include diols and triols and mixtures thereof but higher functionality polyols may be used as minor components in admixture with diols. The polyols may be members of any of the chemical classes of polymeric polyols used or proposed for use in polyurethane formulations. In particular the polyols may be polyesters, polyester amides, polyethers, polythioethers, polycarbonates, polyacetals, polyolefins or polysiloxanes. Preferred polyol molecular weights are from 700 to 3000.

Polyester polyols which may be used include hydroxyl-terminated reaction products of polyalcohols such as ethylene glycol, propylene glycol, diethylene glycol, neopentyl glycol, butanediol, furan dimethanol, cyclohexane dimethanol, glycerol, trimethylol propane or pentaerythritol or mixtures thereof, with polycarboxylic acids, especially dicarboxylic acids or their ester-forming derivatives, for example heptanedioic acid, octanedioic acid, nonanedioic acid, decanedioic acid, succinic, glutaric and adipic acids or their dimethyl esters, phthalic anhydride or dimethyl terephthalate. Polyesters obtained by the polymerisation of lactones, for example caprolactone, in conjunction with a polyol, may also be used.

Polyester amides may be obtained by the inclusion of aminoalcohols such as ethanolamine in polyesterification mixtures.

Polyether polyols include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylol propane, pentaerythritol or Bisphenol A. Especially useful polyethers include polyoxypropylene diols and triols, poly (oxyethyleneoxypropylene) diols and triols obtained by the simultaneous or sequential addition of ethylene and propylene oxides to appropriate initiators and poly-tetramethylene ether glycols obtained by the polymerisation of tetrahydrofuran. Amine-terminated polyether polyols may also be used.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Suitable polyolefin polyols include hydroxy-terminated butadiene homo- and copolymers.

Organic polyols having molecular weights below 400 which may optionally be used in the preparation of isocyanate-terminated prepolymers particularly include diols and triols and mixtures thereof, but higher functionality polyols may be used. Examples of such lower-molecular weight polyols include ethylene glycol, diethylene glycol, tetraethylene glycol, bis(hydroxyethyl)terephthalate, cyclohexane dimethanol, furan dimethanol, glycerol, and the reaction products, up to a molecular weight of 399, of such polyols with propylene oxide and/or ethylene oxide.

Preferably, the isocyanate-terminated prepolymers are self-dispersible in water. This may be achieved by including isocyanate-reactive and/or diisocyanate compound(s) bearing non-ionic and/or ionic dispersing groups (or groups which may subsequently be converted to such dispersing groups) as reactants In the preparation of the prepolymer.

Typically, ionic dispersing groups are anionic salt groups, e.g., carboxylate salt groups. Such groups may be provided, e.g., by employing an isocyanate-reactive compound having at least one acid group and at least two hydroxyl groups as a reactant in the prepolymer formation. The preferred carboxy-containing diol is 2,2-dimethylolpropionic acid. If desired, the carboxy containing diol or triol may be incorporated into a polyester by reaction with a dicarboxylic acid before being incorporated into the prepolymer.

The conversion of any acid groups present in the prepolymer to anionic salt groups may be effected by neutralising the acidic groups before, after (if in combination with non-ionic stabilisation) or simultaneously with the formation of an aqueous dispersion of the prepolymer.

Non-ionic dispersing groups typically are pendant polyoxyalkylene groups, particularly polyoxyethylene groups. Such groups may be provided, e.g., by employing diols having pendant polyoxyethylene chains as a reactant in the prepolymer formation. The polyethylene glycol monoethers suitably have weight average molecular weights in the range of 250 to 3000 and, preferably, in the range of 500 to 2000. If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The pendant dispersing group content of the polyurethane resin (if present) may vary within wide limits but should be sufficient to provide the polyurethane resin with the required degree of water dispersibility. Typically, the pendant dispersing group content will vary from 10 to 90 milli-equivalents (more preferably from 18 to 65 milli-equivalents) of pendant anionic dispersing groups (particularly carboxylate groups) per 100 g polyurethane resin and/or from 0.5 to 250 milli-equivalents of pendant (lateral or terminal) non-ionic dispersing groups (particularly polyethylene oxide groups) per 100 g polyurethane resin.

The aqueous polyurethane dispersions may be prepared by dispersing the isocyanate-terminated polyurethane prepolymer (optionally carried in an organic solvent medium) in an aqueous medium (using, e.g., surfactants or, more preferably, by utilising the self-dispersibility of the prepolymer if dispersing groups are present therein. although surfactants may still be employed if desired) and chain extending the prepolymer with an active hydrogen-containing chain extender in the aqueous phase. The prepolymer may also be chain extended to form the polyurethane resin while dissolved in organic solvent (usually acetone), followed by the addition of water to the polymer solution until water becomes the continuous phase and the subsequent removal of the solvent by distillation to form a purely aqueous dispersion. Active hydrogen-containing chain extenders include a polyol, an amino-alcohol, a primary or secondary aliphatic, alicyclic, aromatic, araliphatic or heterocyclic diamine or polyamine, or hydrazine or a substituted hydrazine. Water-soluble chain extenders are preferred and water itself may be effective. Examples of such chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl)amine, 3,3'-dinitrobenzidine, 4,4'-diaminodiphenyl methane, menthane diamine, m-xylene diamine, isophorone diamine, and adducts of diethylene triamine to acrylate or its hydrolysed products. Other chain extenders include hydrazine, azines such as acetone azine, substituted hydrazines such as dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, hydrazides made by reacting lactones with hydrazine such as gamma-hydroxylbutyric hydrazide, bis-semi-carbazide, and bis-hydrazide carbonic esters of glycols such as any of the glycols mentioned above. Where the chain extender is other than water, for example a polyol, polyamine or hydrazine, it may be added to the aqueous dispersion of prepolymer or, alternatively, it may already be present in the aqueous medium when the prepolymer is dispersed therein.

Carbonyl functionality may be introduced into the polyurethane backbone during the prepolymer formation and/or during the chain extension step. The carbonyl functionality in the polyurethane resin may be incorporated by virtue of (an) isocyanate-reactive compound(s) providing carbonyl functionality being included as a reactant in the formation of the isocyanate terminated prepolymer. Examples of such compounds are carbonyl compounds with at least one and preferably at least two isocyanate-reactive groups, e.g., dihydroxyketones such as dihydroxyacetone and the adduct obtained by a Michael addition reaction of diacetone acrylamide with a diamine or an alkanolamine. Carbonyl compounds with only one isocyanate-reactive group can also be used if the urethane chain has been compensatingly branched with, e.g., triols, triisocyanates and/or triamines.

Otherwise, the active hydrogen-containing chain extending material may include a proportion of or be entirely composed of extending material providing carbonyl functionality. Examples include carbonyl-functional diamino compounds such as the Michael addition product of two moles of di-acetone acrylamide with one mole of a diamine.

Hydrazine (or hydrazone) functionality may be introduced during the prepolymer formation and/or during the chain extension step. The hydrazine (or hydrazone) functionality in the polyurethane resin may be incorporated by virtue of (an) isocyanate-reactive compound(s) providing hydrazine (or hydrazone) functionality pendant to the polyurethane chain being included as a reactant in the formation of the isocyanate-terminated prepolymer. Examples include a monoaldehyde- or monoketone-blocked hydrazine compound, by which is meant a compound in which the hydrazine functionality has been blocked by reaction with a monoaldehyde or a monoketone (preferably of boiling point 30–200° C., such as acetone or methylethyl ketone) to form a hydrazone structure. This expedient is employed because otherwise a hydrazine functionality will react during the prepolymer preparation and so be partially or even completely removed. The blocked hydrazine functionality is not labile under anhydrous conditions, however, and moreover is sufficiently stable at pH above 7 (preferably above 8) even in an aqueous medium, such alkaline conditions preferably being achieved by the presence of a volatile organic amine such as triethylamine. Consequently, the chain extension step may be performed with the prepolymer in aqueous dispersion and the chain extending agent(s) in the aqueous phase, with the pH above 7 (preferably above 8), without the blocked hydrazine functionality being significantly affected or removed. Subsequent acidification as a result of evaporation of the neutralising agent during film formation will cause regeneration of the hydrazine functionality (which is then available for crosslinking purposes) together with the monoaldehyde or monoketone blocking compound (which, if a volatile material such as acetone or methylethyl ketone is used, will also be removed by evaporation during film formation).

Active hydrogen-containing chain extending compounds with a hydrazine (or hydrazone) functionality include diamino hydrazides. Such compounds may be prepared by reacting a diamine of formula $H_2N-R^1-NH_2$ with 0.2 to 2 moles of an acrylic acid derivative, preferably ethyl acrylate, and then reacting the product obtained with hydrazine. Suitable diamines of the formula $H_2N-R^1-NH_2$ include aliphatic diamines with 2 to 15 carbon atoms and cycloaliphatic and aromatic diamines with 6 to 15 carbon atoms such as ethylene diamine, 1,4-butane diamine, 1,6-hexane diamine, 2-methyl-1,5-pentane diamine, 2,2,4-trimethyl-1,6-hexane diamine, 2,2,4- and 2,4,4-trimethyl-1,6-hexane diamine, isophorone diamine, bis(4-aminocyclohexyl)methane, and di(aminomethyl)benzene. Isophorone diamine is a preferred diamine.

Polyurethane resins which incorporate chain-pendant carbonyl functionality preferably contain a proportion of carbonyl groups in the resin within the range of 3 to 140 milli-equivalents, more preferably 5 to 80 milli-equivalents, per 100 g of polyurethane resin. Polyurethane resins which incorporate chain-pendant hydrazide (or hydrazone) functionality in the resin preferably contain a proportion within the range of 3 to 140 milli-equivalents, more preferably 6 to 80 milli-equivalents, per 100 g of polyurethane resin. The polyurethane/acrylate hybrid dispersions may also incorporate polycarbonyl compound(s). Examples of suitable polycarbonyl compounds are di- or poly-ketones, di- or poly-aldehydes, and aidehyde-ketones such as glyoxal, 2,5-hexanedione, glutaric dialdehyde, succinic dialdehyde, acetyl acetone, acetonyl acetone, and acetone dicarboxylic acid ester.

Examples of such suitable polyhydrazine (or polyhydrazone) compounds include dicarboxylic acid bishydrazides such as oxalic acid dihydrazide, maleic acid dihydrazide, succinic acid dihydrazide, glutaric acid dihydrazide, adipic acid dihydrazide, cyclohexane dicarboxylic acid bis-hydrazide, azelaic acid bis-hydrazide, and sebacic acid dihydrazide. Other suitable compounds are polyhydrazides of carbonic acid, e.g., carbonic acid dihydrazide, and bis-semicarbazides, especially aliphatic and cycloaliphatic bis-semicarbazides. Polyhydrazides of aromatic polycarboxylic acids, e.g., the dihydrazides of phthalic acid, terephthalic acid and isophthalic acid, and the dihydrazides, trihydrazides, and tetrahydrazides of pyromellitic acid, are other examples. Examples of other suitable compounds are trihydrazides, e.g., nitrilotriacetic acid trihydrazide, and tetrahydrazides, e.g., ethylene diamine tetraacetic acid tetrahydrazide. The compositions of the invention may optionally contain 0.0002 to 0.02 mole per mole of hydrazine (or hydrazone) groups of a heavy metal ion. This may be added in the form of suitable water-soluble metal salts, particularly chlorides, sulphates, and acetates. Suitable heavy metal water-soluble salts are, in particular, those of Cu, Zn, Fe, Cr, Mn, Pb, V, Co, and Ni.

The vinyl polymer is obtained by the free radical addition polymerisation of at least one olefinically unsaturated monomer selected from esters of acrylic acid and methacrylic acid, examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, and n-propyl methacrylate. The vinyl polymer may be obtained by introducing other vinyl monomers such as 1,3-butadiene, isoprene, styrene, divinyl benzene, acrylonitrile, methacrylonitrile, vinyl halides (such as vinyl chloride), vinyl esters (such as vinyl acetate, vinyl propionate, and vinyl laurate), heterocyclic vinyl compounds, alkyl esters of monolefinically unsaturated dicarboxylic acids (such as di-n-butyl maleate and di-n-butyl fumarate). In addition, the vinyl polymer may contain, as copolymerised units, small amounts (mostly from 0.5 to 10% by weight) of monoolefinically unsaturated monocarboxylic acids and/or dicarboxylic acids, mostly of 3 to 6 carbon atoms, and/or of their N-unsubstituted or N-substituted amides, especially acrylic acid, methacrylic acid, beta-carboxyethylacrylate, fumaric acid, itaconic acid, acrylamide, methacrylamide, N-methyl acrylamide, N-methylol acrylamide, N-n-butoxymethyl methacrylamide, maleimide, and maleic acid diamide, as well as monoolefinically unsaturated sulphonic acids, especially vinyl sulphonic acid and methacrylamidopropane sulphonic acid.

Examples of carbonyl-containing vinyl monomers which may be mentioned include acrolein, methacrolein, diacetone-acrylamide, crotonaldehyde, 4-vinylbenzaldehyde, vinyl alkyl ketones with 4 to 7 carbon atoms such as vinyl methyl ketone, and acryloxy- and methacryloxy-alkyl propanals. Further examples include acrylamidopivalaldehyde, methacrylamidopivalaldehyde, 3-acrylamidomethyl anisaldehyde, diacetone acrylate, acetonyl acrylate, diacetone methacrylate, acetoacetoxyethyl methacrylate, 2-hydroxypropyl acrylate acetylacetate, and butanediol acrylate acetylacetate. The proportion of carbonyl-functional groups in the vinyl polymer preferably is 3 to 200 milli-equivalents per 100 g polymer (more preferably 8 to 100 milli-equivalents per 100 g polymer). Preferably a vinyl polymer bearing chain-pendant hydrazine- (or hydrazone-) functional groups is the product formed by reacting at least a free radical addition polymer formed by polymerising at least one olefinically unsaturated monomer providing chain-pendant hydrazinolysable groups and a hydrazine-yielding agent, whereby at least a proportion of the chain-pendant hydrazinolysable groups are converted to hydrazine-functional groups. Suitable groups for hydrazinolysis are, e.g., acid, acid halide and (especially) ester groups. Examples of monomers providing chain-pendant hydrazinolysable groups include crotonic acid, α-chloracrylic acid, and especially acrylic acid, and acid chlorides or esters thereof, and also methacrylic acid and acid chlorides or esters thereof. Advantageously use is made of acrylic acid esters of alcohols of low molecular weight, such as methyl, ethyl, propyl, isopropyl, n-butyl or secondary butyl esters.

As hydrazine agents may be particularly mentioned hydrazine itself and hydrazine monohydrate. When a hydrazone-containing vinyl polymer is required, the hydrazine groups may be converted to hydrazone groups by reacting a saturated monoketone or monoaldehyde containing at least two carbon atoms and, preferably, having a boiling point of 30 to 200° C. Examples of such compounds include, for example, aliphatic ketones or aldehydes, such as acetone, ethylmethyl ketone, diisopropyl ketone, isobutylmethyl ketone, di-n-butyl ketone, dodecylmethyl ketone, octadecyl isobutyl ketone. acetaldehyde or propionaldehyde, or cycloalipatic ketones such as cyclohexanone, or camphor, or aryl alkyl ketones, such as acetophenone, or compounds such as benzaldehyde or furturaldehyde, or finally amino-ketones or amino-aldehydes, such as para-acetylamino-benzaldehyde, diacetone-amine, N-methyl-diacetone-amine, aminomethylphenyl ketone, or oxy-ketones and oxy-aldehydes, such as glucose, fructose, ortho-oxyacetophenone, salicylaldehyde or halogenated aldehydes and ketones such as chloral or chlorinated acetones.

Examples of polyurethane/acrylate hybrid dispersions include Neopac E125 and Neopac E121, ex Zeneca, Hybridur HY 570 and HY 540, ex Air products, and Daotan VTW 1265, ex Vianova.

Polyurethane dispersions with oxidatively drying groups may be prepared as mentioned above by the reaction of an organic polyisocyanate with an organic compound containing isocyanate-reactive groups, particularly a macro polyol, optionally with the inclusion of a low-molecular weight organic polyol. A favoured route to their formation involves the formation of an isocyanate-terminated polyurethane prepolymer followed by chain extension with an active hydrogen-containing compound. Such a reaction route is described in EP-A-0 444 454.

To introduce oxidative groups into such a polyurethane resin, the polyols mentioned above may be prepared by the reaction of a hydroxyl-, carboxyl-, amino-, and thiol-reactive compound comprising oxidative groups. Such oxidative groups are derivatives of (poly)unsaturated fatty acids, preferably those containing 12 to 26 carbon atoms. Specific examples are mono-unsaturated fatty acids, such as lauroleic acid, myristoleic acid, palmitoleic acid, oleic acid, gadoleic acid, erucic acid, ricinolinic acid; bi-unsaturated fatty acids, such as linoleic acid; tri-unsaturated acids, such as linolenic acid, eleostearic acid, and licanic acid; quadri-unsaturated fatty acids, such as arachidonic acid and clupanodonic acid, and other unsaturated fatty acids obtained from animal or vegetable oils. The polyurethane dispersion may further comprise derivatives of saturated fatty acids, such as lauric acid, myristic acid, palmitic acid, stearic acid, and arachidic acid.

Examples of polyurethane dispersions with oxidatively drying groups include Neorez R2001, Neorez R2020, and Neorez R2040, ex Zeneca, Valires HA 04001, ex Actichem, Spensol F97 ex Reichold, and Halwedrol OX 47-1-40, ex H üttenes-Albertus.

Optionally, other resins may be present in the coating composition according to the present invention. Examples of these resins include polyurethane resins, polyacrylate resins, and alkyd resins. Preferably, an alkyd resin is added to the coating composition. Preferably, the coating composition comprises 10 to 70 wt. % alkyd resin on total solid resins. More preferably, the coating composition comprises 25 to 60 wt. % alkyd resin on total solid resins.

At least part of the alkyd resin comprises oxidatively drying groups, i.e., unsaturated, aliphatic compounds, at least a portion of which is polyunsaturated. Thus, the alkyd resin may be prepared from unsaturated and saturated fatty acids, polycarboxylic acids, and di- or polyvalent hydroxyl compounds.

The number of unsaturated fatty acids eligible for use in the preparation of the alkyd resins to be employed according to the invention is exceedingly large. However, preference is given to the use of mono- and polyunsaturated fatty acids, preferably those containing 12 to 26 carbon atoms. Specific examples are mono-unsaturated fatty acids, such as lauroleic acid, myristoleic acid, palmitoleic acid, oleic acid, gadoleic acid, erucic acid, ricinolinic acid; bi-unsaturated fatty acids, such as linoleic acid; tri-unsaturated acids, such as linolenic acid, eleostearic acid, and licanic acid; quadri-unsaturated fatty acids, such as arachidonic acid and clupanodonic acid, and other unsaturated fatty acids obtained from animal or vegetable oils. The number of saturated fatty acids is also exceedingly large. Preference is given to the use of saturated fatty acids containing 12 to 26 carbon atoms. Specific examples include lauric acid, myristic acid, palmitic acid, stearic acid, and arachidic acid. Other monocarboxylic acids suitable for use include tetrahydrobenzoic acid and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed, optionally in the presence of one or more saturated, (cyclo)aliphatic or aromatic monocarboxylic acids, e.g., pivalic acid, 2-ethylhexanoic acid, lauric acid, palmitic acid, stearic acid, 4-tert.butyl-benzoic acid, cyclopentane carboxylic acid, naphthenic acid, cyclohexane carboxylic acid, 2,4-dimethyl benzoic acid, 2-methyl benzoic acid, and benzoic acid.

Examples of polycarboxylic acids include phthalic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerised fatty acids, cyclopentane-1,2-dicarboxylic acid, cyclohexane-1,2-dicarboxylic acid, 4-methylcyclohexane-1, 2-dicarboxylic acid, tetrahydrophthalic acid, endomethylene-cyclohexane-1,2-dicarboxylic acid, butane-1,2,3,4-tetracarboxylic acid, endoisopropylidene-cyclohexane-1,2-dicarboxylic acid, cyclohexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1–4 carbon atoms.

In addition, the alkyd resin comprises di- or polyvalent hydroxyl compounds. Examples of suitable divalent hydroxyl compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol. Preferably, use is made of compounds having 3–12 carbon atoms, e.g., trimethylol propane and pentaerythritol.

The alkyd resins can be obtained by direct esterification of the constituent components, with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil. Transesterification with the other added acids and diols will then give the final alkyd resin. This transesterification generally takes place at a temperature in the range of 115 to 250° C., optionally with solvents such as toluene and/or xylene also present. The reaction generally is carried out in the presence of a catalytic amount of a transesterification catalyst. Examples of transesterification catalysts suitable for use include acids such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

The number average molecular weight of the alkyd resin thus prepared preferably is at least 1000, preferably from 2000 to 5000. To be incorporated into the coating composition of the present invention, the alkyd resin is dispersed in water with 2–30 wt. % surfactant.

For the purposes of this invention an aqueous coating composition means a composition in an aqueous medium of which water is the principal component. Minor amounts of organic liquids, i.e. co-solvents may optionally be present. Examples of co-solvents include propylene carbonate, N-methyl pyrrolidone (NMP), ethylene diglycol, butyl glycol, butyl diglycol, n-butoxy propanol, and dipropylene glycol monomethyl ether.

If so desired, the coating composition according to the invention may contain all sorts of additives or adjuvants, e.g., pigments, dyes, fillers, anti-oxidants, anti-ozonants, matting agents, thixotropic agents, pigment dispersing agents, thickening agents, wetting agents, siccatives sterically hindered amines, bactericides, fungicides, anti-skinning agents, perfumes, anti-foaming agents, drying stabilisers, and waxes. Preferably, a thickening agent is used in the coating composition of the present invention, such as Acrysol RM5, ex Rohm & Haas, and Polyphobe 9823, ex Union Carbide. More preferably, such a thickening agent is an associative thickener, such as associative polyurethane and polyacrylate thickeners. Examples include Acrysol RM 2020 and Acrysol RM8, ex Rohm & Haas, Bermodol PUR2130, ex Akzo Nobel, Rheo 2000 and Coapur 5035, ex Coatex, Tafigel PUR 40 and Tafigel PUR 45, ex Muntzing, Serad FX 1035 and FX 1070, ex Servo, and Optiflo L100 and L120, ex Ashland Süd-chemie. Preferably, up to 10 wt. % (solid on solid resin) of thickening agent is used in the present coating compositions, more preferably 1 to 10 wt. %, most preferably 2 to 5 wt. %.

Siccatives may also be present in the coating compositions of the invention. Examples of siccatives are metal salts of aliphatic acids including cycloaliphatic acids, such as octanoic acid and naphthenic acid, where the metal is, for example, cobalt, manganese, lead, zirconium, calcium, zinc, and rare earth metals. Also mixtures of siccatives are used. The siccatives (calculated as

EXAMPLES

Unless otherwise stated, the properties of the coating compositions and the resulting films are measured as follows.

Hardness

The coating compositions were applied on glass panels with a draw bar (150 μm theoretical wet film thickness) by using the K control coater for a reproducible application rate method. The films were aged at 23° C. for 4 weeks. The König Hardness was measured in number of oscillations at several time intervals during ageing in accordance with ISO 1522.

Levelling on Tin/recoatability

The coating composition was applied with a brush on a tin panel (12 m²/l). After one day drying at room temperature, a second layer was applied to half of the panel. Levelling on both halves of the panel was determined by assessing the brush marks on a scale from 1(=bad) to 10 (=good). Recoatability was also assessed on the same scale.

Open Time

The "practical" open time was determined by applying 80 g/m² of a coating composition on a plastified hardboard panel and rebrushing a small strip every minute. The panel was dried overnight at room temperature. The open time is the time (in minutes) after which the brushmarks of the rebrushing remain visible in the dried paint.

Wet Edge Time

The wet edge time was determined by applying 80 g/m² of a coating composition on the first half of a plastified hardboard panel. At 1 minute intervals narrow stripes were applied on the second half of the panel, partly overlapping the painted first half of the panel. The panel was dried overnight at metal) are usually applied in an amount of 0,001 to 5 wt. %, calculated on the alkyd resin solids content.

Suitable pigments are, e.g., natural or synthetic pigments which may be transparent or not. Examples of suitable pigments are titanium dioxide, red iron oxide, orange iron oxide, yellow iron oxide, phthalocyanine blue, phthalocyanine green, molybdate red, chromium titanate, and earth colours such as ochres, green earths, umbers, and burnt or raw Siennas.

The coating compositions can be applied to a substrate in any suitable manner, e.g., by means of roller coating, spraying, brushing, sprinkling, flow coating or dipping. Preferably, the composition is applied by brushing and roller coating.

Suitable substrates include metals or synthetic materials, wood, concrete, cement, brick, paper or leather, all of which may optionally have been pre-treated or pre-painted. Suitable metals include iron, steel, and aluminium. The applied coat can be cured very suitably at a temperature of, e.g., 0–40° C. Optionally, a curing temperature above 40° C. may be employed, as a result of which the curing time can be reduced. Preferably, the coating composition can be used as translucent or opaque primer or topcoat or as clearcoat in decorative applications.

The invention will be further described in the following examples, which must not be construed as limiting the scope of the present invention. room temperature. The wet edge time is the time after which a stripe in the overlap zone is seen.

Scratch Resistance

Painted panels were scratched with a nail. The scratch resistant was determined visually on a scale from 1 (=bad) to 10 (=good).

VOC

The VOC of the coating composition is calculated in accordance with ASTM 3960-92.

Examples 1–3 and Comparative Examples A and B

Coating compositions were prepared consisting of the following components:

60 wt. % Neopac E 125/Neorez R 2001 (35 wt. % in water/NMP)

25 wt. % pigment paste (70 wt. % $TiO_2$, water, and additives)

3 wt. % flattening paste (15 wt. % matting agent, water, and additives)

1 wt. % wetting agent (42 wt. % in water)

2 wt. % butyl glycol addition of NMP and associative polyurethane thickener up to 100%.

| Ex. | Neopac E125:Neorez R2001[1] | ICI-η (dPa · s) | Stormer-η (KU) | VOC (g/l) | Thick.[2] (s/s) |
|---|---|---|---|---|---|
| A | 1:0 | 2 | 84 | 258 | 4.3 |
| 1 | 3:1 | 2 | 81 | 262 | 4.1 |
| 2 | 1:1 | 2.1 | 80 | 248 | 3.9 |
| 3 | 1:3 | 2.1 | 79 | 248 | 3.8 |
| B | 0:1 | 2 | 75 | 240 | 2.9 |

[1]the polyurethane ratio is on solids
[2]amount of associative polyurethane thickener (solid on solid resin)

| Ex. | Levelling 1 layer/2 layers | König hardness 1 day/1 week | Open time (min.) | Scratch resistance |
|---|---|---|---|---|
| A | 7/6 | 28/36 | 2 | 1 |
| 1 | 9/8 | 27/29 | 7 | 7 |
| 2 | 9/8 | 23/28 | 6 | 7 |
| 3 | 9/8 | 12/34 | 6 | 7 |
| B | 7/6 | 12/55 | 2 | 7 |

It was surprisingly found that the levelling and the open time of the aqueous coating compositions comprising mixtures of Neorez R 2001 and Neopac E125 in different ratios were better than the levelling and the open time of the coating compositions comprising one of the two resins. The hardness and scratch resistance remained at a very good level in the aqueous coating compositions according to the invention.

Examples 4 and 5

White coating compositions were prepared comprising a 1:1 polyurethane mixture of Neorez R 2001 and Neopac E125 admixed with an alkyd emulsion (1:1).

34 wt. % Neopac E 125/Neorez R 2001 (35 wt. % in water/NMP)

20 wt. % alkyd emulsion 25 wt. % pigment paste (70 wt. % TiO$_2$, water, and additives)

1 wt. % wetting agent (42 wt. % in water)

2 wt. % butyl glycol 5 wt. % NMP 0.4 wt. % cobalt drier 4 wt. % water addition of flattening paste (15 wt. % matting agent, water, and additives) and associative polyurethane thickener up to 100%.

The alkyd emulsion was prepared from isophthalic acid, sunflower fatty acid, p-t.butyl benzoic acid, pentaerythritol, and trimethylol propane, has a Mn of 4000, a Mw of 124 000, and is emulsified with 6% surfactant. The solid content is 59.2 wt. %.

| Ex. | Neopac E125:Neorez R2001:alkyd emulsion | Levelling 1 layer/2 layers | Open time (min.) | Wet edge time (minutes) |
|---|---|---|---|---|
| 4 | 1:1:— | 9/8 | 7 | <2 |
| 5 | 1:1:2 | 8/7 | >7 | 4 |

It was found that the open time of the polyurethane mixture (Example 4) of 7 minutes increased upon mixing with the alkyd emulsion (Example 5). The levelling decreased slightly but is still at a very good level. The wet edge time improved from less than 2 minutes to about 4 minutes.

Examples 6–8

White coating compositions were prepared comprising a polyurethane mixture of Neorez R 2001 and Neopac E125 admixed with an alkyd emulsion according to the coating compositions mentioned in Examples 4–5. The alkyd emulsions were prepared from isophthalic acid, sunflower fatty acid, p-t.butyl benzoic acid, pentaerythritol, and trimethylol propane, and have a Mn of 3200 and a Mw of 70 000. The solid content is 59.2 wt. %.

| Ex. | Oil length of alkyd emulsion | Neopac E125:Neorez R2001:alkyd emulsion | Levelling 1 layer/2 layers | Open time (min.) |
|---|---|---|---|---|
| 6 | 40% | 3:1:4 | 8/7 | >7 |
| 7 | 55% | 3:1:4 | 8/7 | >7 |
| 8 | 75% | 3:1:4 | 8/5 | >7 |

By admixing the polyurethane mixture with alkyd emulsion a white pigmented coating composition can be obtained with excellent open time and good levelling. All other properties are acceptable.

What is claimed is:

1. Aqueous coating composition comprising

5–95 wt. % of a polyurethane/acrylate hybrid dispersion and

95–5 wt. % of a dispersion of a polyurethane resin with oxidatively drying groups.

2. Coating composition according to claim 1 comprising:

50–85 wt. % of a polyurethane/acrylate hybrid dispersion and

15–50 wt. % of a dispersion of a polyurethane resin with oxidatively drying groups.

3. Coating composition according to claim 1 wherein the composition has a VOC of 350 g/l or less.

4. Coating composition according to claim 1 wherein the polyurethane/acrylate hybrid dispersion comprises hydrazine- (or hydrazone-) functional groups and carbonyl-functional groups to provide a self-crosslinking reaction.

5. Coating composition according to claim 1 further comprising a polyurethane resin, a polyacrylate resin, an alkyd resin, or mixtures thereof.

6. Coating composition according to claim 5 further comprising an emulsion of an alkyd resin.

7. Coating composition according to claim 6 wherein the coating composition comprises 10 to 70 wt. % on solid resins of an emulsion of an alkyd resin.

8. Coating composition according to claim 1 wherein the coating composition comprises an associative thickener.

9. Coating composition according to claim 8 wherein the coating composition comprises up to 10 wt. % (solid on solid resin) of an associative thickener.

10. A method of making an aqueous coating composition, the method comprising mixing 5–95 wt. % of a polyurethane/acrylate hybrid dispersion and 95–5 wt. % of a dispersion of a polyurethane resin with oxidatively drying groups.

11. A method of making an aqueous coating composition according to claim 10, the method comprising mixing:

50–85 wt. % of a polyurethane/acrylate hybrid dispersion and

15–50 wt. % of a dispersion of a polyurethane resin with oxidatively drying groups.

12. A method of making a coating composition according to claim 10 wherein the composition has a VOC of 350 g/l or less.

13. A method of making a coating composition according to claim 10 wherein the polyurethane/acrylate hybrid dispersion comprises hydrazine- (or hydrazone-) functional groups and carbonyl-functional groups to provide a self-crosslinking reaction.

14. A method of making a coating composition according to claim 10, the method further comprising mixing in the coating composition a polyurethane resin, a polyacrylate resin, an alkyd resin, or mixtures thereof.

15. A method of making a coating composition according to claim 14, the method further comprising mixing in the coating composition an emulsion of an alkyd resin.

16. A method of making a coating composition according to claim 15, wherein the coating composition comprises 10 to 70 wt. % on solid resins of an emulsion of an alkyd resin.

17. A method of making a coating composition according to claim 10, the method further comprising mixing in the coating composition an associative thickener.

18. A method of making a coating composition according to claim 10 wherein the coating composition comprises up to 10 wt. % (solid on solid resin) of an associative thickener.

19. A topcoat or clearcoat comprising the coating composition of claim 1.

* * * * *